US008797461B2

(12) United States Patent
Davis et al.

(10) Patent No.: US 8,797,461 B2
(45) Date of Patent: Aug. 5, 2014

(54) SCREEN TIME CONTROL DEVICE AND METHOD

(71) Applicant: Behavioral Technologies LLC, Wichita, KS (US)

(72) Inventors: Steve G. Davis, North Liberty, IA (US); Jim Vincent, Wichita, KS (US); Trever Patton, Wichita, KS (US); Kristin Christopherson, Iowa City, IA (US)

(73) Assignee: Behavioral Technologies LLC, Wichita, KS (US)

( * ) Notice: Subject to any disclaimer, the term of this patent is extended or adjusted under 35 U.S.C. 154(b) by 0 days.

(21) Appl. No.: 14/073,277

(22) Filed: Nov. 6, 2013

(65) Prior Publication Data

US 2014/0184911 A1 Jul. 3, 2014

Related U.S. Application Data

(60) Provisional application No. 61/746,668, filed on Dec. 28, 2012.

(51) Int. Cl.
H04N 5/445 (2011.01)

(52) U.S. Cl.
CPC .................. H04N 5/44582 (2013.01)
USPC ........... 348/563; 348/565; 348/567; 348/569; 348/523; 348/661; 348/712; 348/719; 348/725; 348/730; 348/734; 348/739; 348/468; 348/474; 348/396.1; 348/333.02; 348/274; 348/194; 348/184; 348/180; 348/177; 348/54; 348/14.08; 348/14.03; 345/530; 345/502; 345/473; 345/204; 725/9; 725/28; 725/32; 725/36; 725/37; 725/38; 725/43; 725/58; 725/61; 725/132; 725/135; 725/138; 725/140; 725/142; 725/152

(58) Field of Classification Search
USPC ......... 348/563, 523, 565, 567, 569, 661, 712, 348/719, 725, 730, 734, 468, 474, 396.1, 348/180, 184, 194, 14.08, 739, 333.02, 274, 348/177, 14.03, 54; 345/530, 502, 474, 345/302, 204; 725/28, 37, 38, 43, 93, 97, 9, 725/32, 36, 58, 61, 132, 135, 138, 140, 142, 725/152
See application file for complete search history.

(56) References Cited

U.S. PATENT DOCUMENTS 5,844,596 A * 12/1998 Goodman .................. 348/14.02
5,949,410 A * 9/1999 Fung ............................ 715/203
(Continued)

OTHER PUBLICATIONS

Andrew Huang, Implementation of MITM Attack on HDCP-Secured Links, website article at http://www.bunniestudios.com/blog/?p=2117, Date Unknown but prior to U.S. filing date.
(Continued)

Primary Examiner — Jefferey Harold
Assistant Examiner — Mustafizur Rahman
(74) Attorney, Agent, or Firm — Jason R. Sytsma; Shuttleworth & Ingersoll, PLC

(57) ABSTRACT

A screen time control device includes a source interface for receiving a video signal, a processor connected to the video source interface for overlaying the video signal with a translucent signal to produce an overlaid video signal, and a device interface connected to the processor for receiving the overlaid video signal and providing the overlaid video signal to the display device. The processor substitutes the translucent signal in the overlaid video signal with a parental signal, where the parental signal can be a substantially opaque overlay signal that masks an image on the screen of the display device to prohibit viewing of the screen, a textual message, or a combination of both.

16 Claims, 7 Drawing Sheets

(56) References Cited

U.S. PATENT DOCUMENTS

| | | | |
|---|---|---|---|
| 6,771,263 B1* | 8/2004 | Behrens et al. | 345/424 |
| 6,919,892 B1* | 7/2005 | Cheiky et al. | 345/473 |
| 8,046,792 B2* | 10/2011 | Seidel et al. | 725/38 |
| 8,109,858 B2 | 2/2012 | Redmann | |
| 8,553,037 B2* | 10/2013 | Smith et al. | 345/473 |
| 2001/0024326 A1* | 9/2001 | Nakamura et al. | 359/618 |
| 2002/0026636 A1* | 2/2002 | LeComte | 725/31 |
| 2003/0188307 A1* | 10/2003 | Mizuno | 725/28 |
| 2004/0261097 A1 | 12/2004 | Hanks | |
| 2005/0268317 A1 | 12/2005 | Cormack et al. | |
| 2006/0136979 A1* | 6/2006 | Staker et al. | 725/134 |
| 2006/0176290 A1* | 8/2006 | Jayaram et al. | 345/204 |
| 2008/0111822 A1* | 5/2008 | Horowitz et al. | 345/530 |
| 2008/0129816 A1* | 6/2008 | Mattila et al. | 348/14.08 |
| 2008/0259223 A1* | 10/2008 | Read et al. | 348/745 |
| 2008/0263611 A1* | 10/2008 | Lecomte | 725/114 |
| 2009/0115901 A1* | 5/2009 | Winter et al. | 348/565 |
| 2009/0317059 A1 | 12/2009 | Chen et al. | |
| 2011/0093882 A1 | 4/2011 | Candelore et al. | |
| 2011/0283311 A1* | 11/2011 | Luong | 725/28 |
| 2012/0167128 A1* | 6/2012 | Bradley | 725/27 |

OTHER PUBLICATIONS

Chumby Wiki, What is NeTV, website article at, http://wiki.chumby.com/index.php/What_is_NeTV, Date unknown but prior to U.S. filing date.

* cited by examiner

SCREEN TIME CONTROL DEVICE AND METHOD

CROSS-REFERENCE TO RELATED APPLICATIONS

The present application claims the benefit of Provisional Patent Application 61/746,668 filed Dec. 28, 2012, the contents of which is hereby incorporated by reference herein.

TECHNICAL FIELD

This disclosure relates to the use of a wireless device and behavior modification protocol that can be used to promote pro-social behaviors through regulating the viewing of a display device.

BACKGROUND

During the last decade, there has been a great deal of research on the negative effects of excessive video game playing and overall "screen time" (TV, computer, video games, etc.) on children. Historically, behavioral problems in individuals exposed to excessive television viewing has been fairly well-documented. And, the previous models applied to excessive television viewing are being increasingly applied to video games.

The American Medical Association along with the American Academy of Pediatrics (www.aap.org), has recently found that excessive gaming can lead to "Video Game Addiction." Although controversial, the definition of Video Game Addiction is an excessive or compulsive use of video games that interferes with a person's everyday life. Individuals typically have a classically conditioned response to video game stimulation that produces a compulsive of addictive pattern of use. In traditional addiction models (which are ever more frequently being applied to video gaming), dopamine levels are elevated via an operant reward, creating a neural pattern that is more securely embedded in the nervous system.

Although not a formal diagnosis in the latest Diagnostic and Statistical Manual for Mental Disorders, the DSM-IV has listed Video Game Addiction as a 'condition for further study.' Video Game Addiction has been linked to poor school performance, aggressive behaviors, sleep and eating problems, obesity, social withdrawal/exclusion of other life events, mood swings, diminished imagination, and attention problems as well as in increase in epileptic seizures (Emotional and Behavioral Effects of Video Games and Internet Overuse, Report of the Council of Science and Public Health, CSAPH Report 12-A-07).

More recently, the American Academy of Pediatrics has recommended that children under 2 year of age not be exposed to "screen time." Furthermore, they recommend that parents limit children's screen time to one to two hours a day, keeping children's bedrooms, free from media, and keeping violent video games out of homes where they may be observed or played by young children.

Currently, there is no systematic way for parents to control and monitor the amount of screen time to which their children are exposed. The primary problem facing parents involves gaining control over screened devices (e.g., television, computer, gaming console) without a power struggle. Transitioning from screen time to a less preferred activity (e.g., study time) can be particular problematic. In many cases, parents will try to physically intervene, or they will attempt to shut the screen off prematurely. This can lead to a physical and/or verbal confrontation that can and often does become repetitive, time consuming, and exhausting for both parents and children.

SUMMARY

Disclosed is a screen time control device, which includes a source interface for receiving a video signal, a processor connected to the video source interface for overlaying the video signal with a translucent signal to produce an overlaid video signal, and a device interface connected to the processor for receiving the overlaid video signal and providing the overlaid video signal to the display device. In this regard, the processor substitutes the translucent signal in the overlaid video signal with a parental signal, where the parental signal can be a substantially opaque overlay signal that masks an image on the screen of the display device to prohibit viewing of the screen, a textual message, or a combination of both.

In an embodiment, a screen time control region of memory includes a first account profile with a daily allowed screen time value that can be increased or decreased in response to a behavior of a person associated with the first account profile. When the daily allowed screen time value is zero, the processor substitutes the translucent signal in the overlaid video signal with the parental signal. The parental signal masks the image on the screen of the display device to prohibit viewing of the screen without turning off the display device in order to avoid damage to the display device.

A monitoring device can be connected to the processor through a network to allow a person in authority to monitor the daily allowed screen time value of the first account profile and increasing or decreasing the daily allowed screen time value in response to the behavior of the person associated with the first account profile.

These and other aspects, features, and advantages of the invention will become apparent upon review of the following description taken in connection with the accompanying drawings. The invention, though, is pointed out with particularity by the appended claims.

DETAILED DESCRIPTION

Systems and methods are disclosed that provide parents (or any other authority figure) with an effective way to modify a child's (or any other subservient) behavior without confrontation by controlling available screen time.

Figure 1:
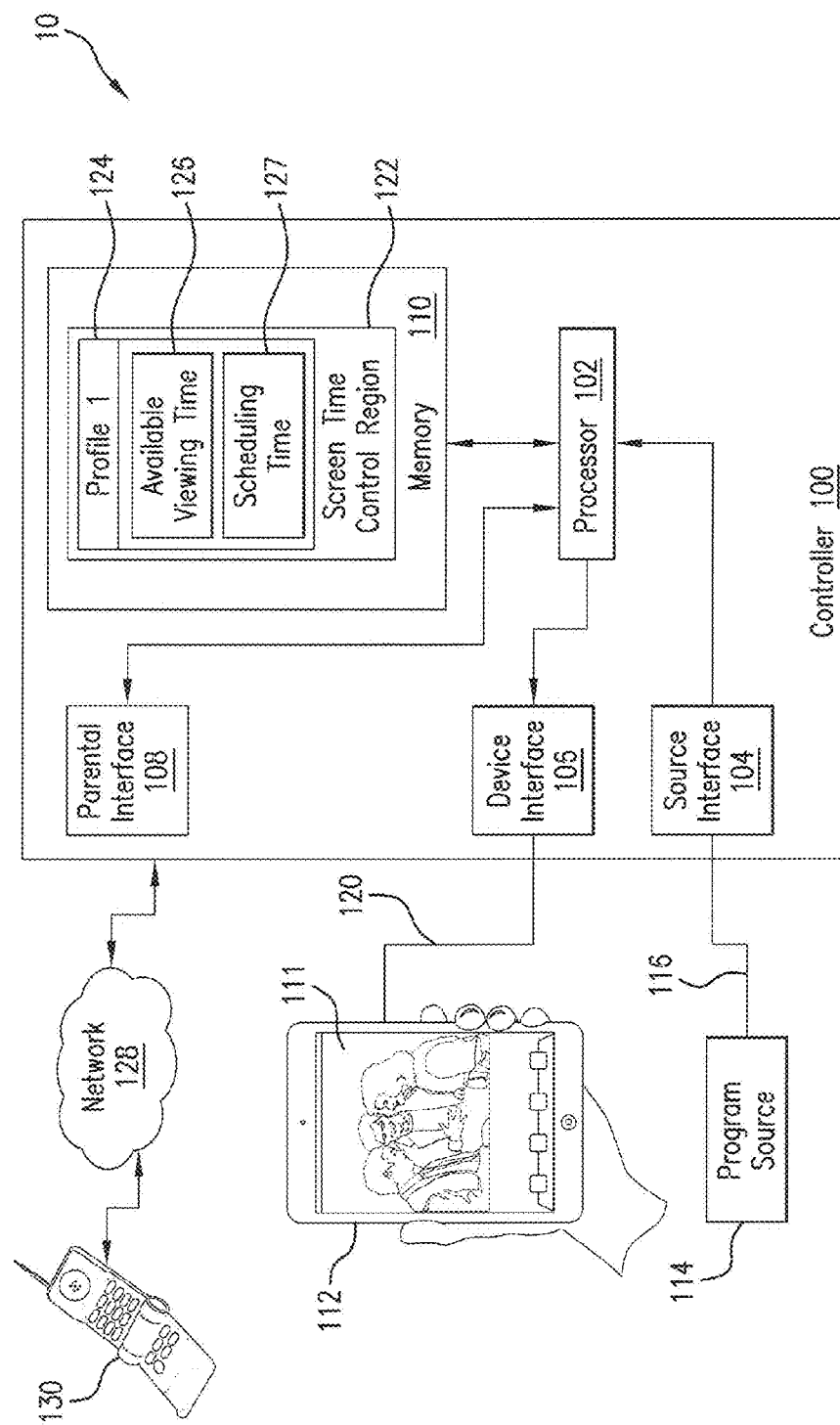
FIG. 1 is a block diagram illustrating one embodiment of a screen time control system in accordance with the present disclosure.

FIG. 1 a block diagram that illustrates one embodiment of a screen time control system 10 in accordance with the present disclosure. A controller 100 comprises at least one processor 102, a source interface 104, a device interface 106, a parental interface 108, and a memory 110. Controller 100 can be used by the authority figure, to regulate viewing of a screen 111 on display device 112 between any number of viewers or users.

Controller 100 is positioned between a program source 114 and display device 112. Program source 114 can be any suitable source of video, and/or audio information, including signals from antennae, cable system, satellite system, VCR, digital video device (DVD), compact disc (CD) device, Internet access system, PC, electronic game player, or the like. Display device 112 can be any device capable of presenting an image, such as a TV screen, computer screen, or the like, whether mobile or not, and whether it is configured for watching TV programming, video games, computer programs, or the like.

The video and/or audio information is received from program source 114 by source interface 104 through connection 116. Signals from program source 114 are provided via source interface 104 to processor 102. Processor 102 receives the signals and overlays the video portion of the signal with a translucent signal, which can be a semi-opaque signal or a semi-transparent signal, that when presented on screen 111 and viewed on display device 112 is virtually imperceptible. The signal with the video portion overlaid with the translucent signal is an overlaid video signal.

Processor 102 then monitors the vertical/horizontal sync of the input signal to know where the input signal is within each frame of video on screen 111. When the input signal to display device 112 is within the translucent region of the overlay, it just passes through the original input video from program source 114 to screen 111 of display device 112; otherwise, screen 111 displays the translucent signal. This allows program source 102 to dynamically synchronize every frame of video, without jitter, and choose the pixel stream to output (and possibly to encrypt). This enables regulation of the viewing of display device 112 without turning on and off any electronics.

Processor 102 may be implemented with a general purpose single- or multi-chip processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein.

Connections 116 and 120 for convenience are illustrated as a hardwire connection, but can be implemented with any other suitable media, such as infrared, optical, wireless or the like without departing from the present invention. In other embodiments, connection 120 may be replaced with other suitable media, such as a bus or the like, and/or may be coupled via one or more other intermediary components without departing from the present invention.

The signal, including the overlaid signal, is provided by processor 102 to device interface 106 and distributed to display device 116 through connection 120 for viewing on screen 111 of display device 112. In embodiments where the original video from program source 114 is encrypted, the translucent signal can be encrypted using similar encryption algorithms and overlaid on the original signal, so when display device 112 decrypts the original video it also decrypts the translucent signal to prevent it from scrambling. Processor 102 does not require decryption keys (or device keys); rather, processor 102 derives the keys being used to encrypt the translucent signal to match the encrypted video signal to match. This allows display device 112 to treat the overlaid video signal no different than the original video from program source 114. Processor 102 does not need to decrypt video from program source 114.

The translucent signal in the overlaid video signal can be modified to mask the underlining original video signal or have a portion overridden with a textual message. Processor 102 modifies the translucent signal by changing the color of the translucent signal to an opaque overlay signal that masks the original video signal. To completely mask the original input signal, the translucent signal is rendered opaque, such as black or some other dark color. When display device 112 decodes the overlaid video signal, all that is shown are the opaque pixels. A textual message can also be provided in a portion of the screen by changing the color of the translucent signal in a portion of the screen. For example, a message in a contrasting font, such as a white font can be displayed at the bottom of the screen.

Figure 5:
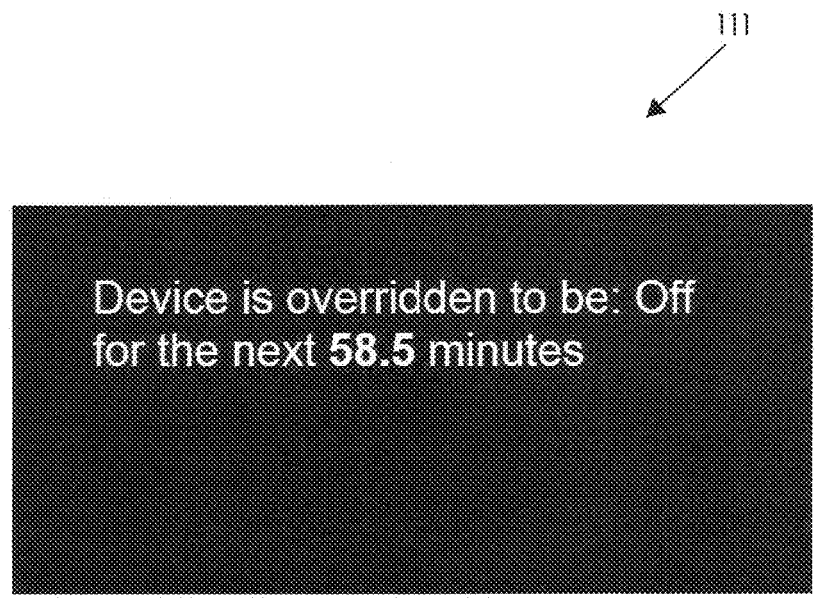
FIG. 5 is an image on the display device of FIG. 1 masking the underlining original video signal.
Figure 6:
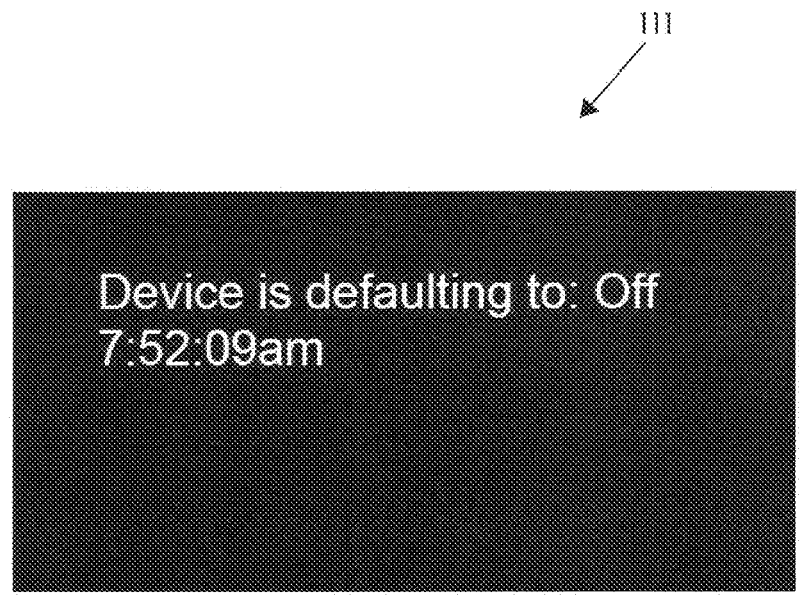
FIG. 6 is an image on the display device of FIG. 1 with the screen displaying a penalty message.
Figure 7:
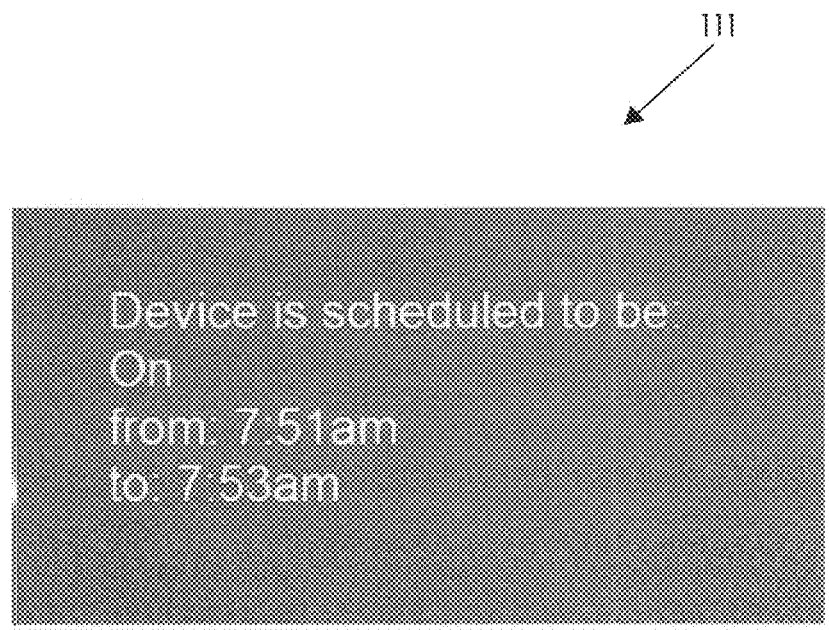
FIG. 7 is an image on the display device of FIG. 1 showing an overlaid video signal.

FIGS. 5-7 show screen 111 operating in accordance with this disclosure. FIG. 5 shows screen 111 with the translucent signal rendered opaque to mask the original input signal. A black screen 111 is all the is visible to the viewer, except in this example, a textual message is also provided in a portion of the screen in a contrasting white font to tell the viewer that he is unable to watch screen 111 of display device 112 for the next 58.5 minutes. FIG. 6, similarly shows screen 111 of display device 112 masked and showing a textual message that display device is off.

FIG. 7 shows an example of what screen 111 of display device 112 looks like when the semi-transparent signal of the overlaid video signal is not masked and the screen is available for viewing. FIG. 7 is for illustrative purposes only and is not intended to show a real-world example. The semi-transparent signal is virtually imperceptible. The textual message shown on screen 111 is intended to represent an image on screen 111 that would be visible to the viewer. In practice, the view could see if he or she were close enough to the screen a semi-transparent pink font instead of the white font that is shown in FIG. 1.

Controller 100 is configured to receive instructions in the form of a parental signal from the authoritative person via the parental interface 108. The instructions can include whether to mask an image on display device 112 or send a textual message for viewing on display device 112. Processor 102 is also configured to store information corresponding to the instructions in a screen time control region 122 of memory 110.

One embodiment of controller 100 comprises logic to monitor total available viewing time of screen 111 of display device 112 by several children. In reference to memory 110, screen time control region 122 can include multiple account profiles 124 corresponding with multiple children, and can be configured for various exemplary program regulation options. Controller 100 blocks further viewing of screen 111 once total available viewing time of a child equals zero by masking the screen in the manner described above. The specified available viewing time is stored in the available viewing time region 126 of profile 124 of memory 122. This has the added benefit of curbing or preventing addiction to video games or television by limiting access to display device 112.

Screen time control device 10 relies on an evidenced based approach to behavior management using the principles of operant conditioning or what is commonly referred to as Behavior Modification (Skinner, 1953). These principle include the use of Positive Reinforcement, Punishment; and Negative Reinforcement. The applications of these evidenced based practices include Differential Attention, Schedules of Reinforcement. Time-Out, Response Costs and Behavior Contracting, which are widely accepted as effective approaches to improving behavior in home, community, and clinical settings (Forehand & McMahon, 1981).

The value associated with the available viewing time can be increased (e.g., Positive Reinforcement) or decreased (e.g., Punishment) at any time by the authority figure (e.g., parent) in response to the behavior of the subject (e.g., child). For example, cooperative behaviors can be rewarded or "reinforced" by adding time to the number of minutes a child can have screen time during the day. If the child earns more time (e.g., does a chore without a fight, completes homework, etc.), minutes can be added to available viewing time region 126 of memory 110.

Parents can also send an individualized message to the child (e.g., Differential Attention), which will appear on screen 111 of display device 112, such as "Good job, you earned 30 minutes." Similarly, uncooperative behaviors can be discouraged by taking away minutes of viewing time (e.g., Response Cost). This can be done without directly confronting (i.e., avoiding physical or verbal conflict) the child because the parent has control over controller 100 from anywhere through program interface 108. If the child loses viewing time, the parent can simply subtract available time from viewing time region 126 of memory 110. The parent could also transmit a message to display device 112 that might say, "You need to earn more screen time," or "You need to talk to your parents." In an embodiment, individuals can wear a wireless device that will "signal" when they have earned or lost screen time.

The authority figure can also temporarily mask the image on screen 111 of display device 112 in immediate response to uncooperative behavior (e.g., the child refuses to clean their room, etc.), as shown in FIG. 5. This is a form of "time-out" from screen time. The authority figure simply uses a monitoring device 130 (described below) to log into controller 100 though parental interface 108 and mask the image on screen 111 in the manner described above. Again, this can be done without conflict. The authority figure simply prevents screen 111 from being viewed until the child becomes cooperative.

The foregoing operates on the principle that short-term and immediate consequences for a child are more effective than longer-term or delayed consequences. In addition to the use of "Time-Out" the parent can use negative reinforcement to encourage cooperative behaviors. As soon as a child increases a particular behavior (e.g., cleaning his room), he can stop an aversive state (e.g., Time-out from screen time). For instance, an immediate message can be sent to the child that reads, "You need to clean your room before playing any games." The child could also be alerted to the conduct necessary to receive viewing time, such as the parent specifying a time or the number of minutes the child must cooperate before gaining access to display device 112. For instance, the parent could specify that the child has to demonstrate 2 hours of cooperation with others (e.g., siblings) before being able to have additional time. In an embodiment this can be done by the parent by sending a message to the child using screen time control system 10 that says the device will be turned off in X-number of minutes, where X can be configured each time the parent send the message or can be a default value such as 5-minutes. This warning gives the child enough time to save any work or save their location on a game.

In another embodiment of controller 100, use of display device 112 can be regulated in accordance with predefined scheduling times. If, for example, the time of day from 5-8 pm is reserved for family meal time and homework, controller 100 blocks viewing of display device 112 by masking the image on screen 111 of display device 112 during this time period. Alternatively, if the time of day reserved for watching display device 112 is limited to 7-8 pm, controller 100 blocks all viewing of display device 112, except for this time period. Further, the scheduling times can be limited to a number of hours on a given day; for example, controller 100 can be programmed to permit two hours of viewing on Saturday. Once the total time on Saturday reaches two hours, the image on display device 112 is masked to prevent further viewing. The scheduling time period is stored in the scheduling time region 127 of profile 124 in memory 110.

These contingencies can be specified in a "Behavior Contract" that establishes an agreement between the parent/teacher and child/student. This Behavior Contract will specify the following: 1.) Positive behaviors that result in increased screen time; 2.) Negative behaviors that will result in decreased screen time; 3.) Conditions of Time-out from screen time; 4.) Conditions of removal of Time-out or conditions for reinstating screen time privileges; and 5.) The daily schedule for screen time use.

| Screen Time Behavior Contract |
| --- |
| This contract specifies the use of Screen Time (e.g., video games; TV; Computer) in your home.<br>This agreement is<br>between_____and_____<br>on this day of_____.<br>SCREEN TIME SCHEDULE<br>I, _____, agree that I can have screen time during the following hours on the following days:<br>Monday: _____to_____<br>Tuesday: _____to_____<br>Wednesday: _____to_____<br>Thursday: _____to_____<br>Friday: _____to_____<br>Saturday: _____to_____<br>Sunday: _____to_____<br>INCREASING POSITIVE BEHAVIORS<br>I,_____, understand that I can increase the amount of screen time up to_____minutes for displaying the following behaviors:<br>1._____  2._____<br>3._____  4._____<br>DECREASING NEGATIVE BEHAVIORS<br>I,_____, also understand that the amount of Screen Time will be reduced for displaying the following behaviors:<br>1._____  2._____<br>3._____  4._____<br>TIME-OUT FROM SCREEN<br>Furthermore, I_____, understand that my access to screen time will be placed in Time Out (I will not be able to use) for a specified period of time if I display the following behaviors:<br>1._____  2._____<br>3._____  4._____<br>I,_____, understand that I can earn back Screen time when I demonstrate appropriate behaviors for _____minutes/hours.<br>SIGNATURES |
| _____   _____<br>Parent/Guardian                         Date<br>_____   _____<br>Child                                          Date |

The present invention contemplates a number of ways for identifying the user of display device 112. An authorization device could be configured in display device 112, positioned inline between display device 112 and controller 100, or in any other position communicatively coupled with controller 100. The authorization device could require a password to log on or some other mechanism of authorization, such as a physical key or card, biometric security or the like. The authorization device can also communicate with controller 100 to confirm the identity of the login information and associate the person who logged in with a particular profile in memory 110.

This allows, for example, the parents' viewing of display device 112 to not subtract from the child's viewing time, or allows controller 100 to work with multiple children each having a profile 124.

Controller 100 can communicate with the authority figure over a network 128 through parental interface 108. Parental interface 108 can be any network interface device, such as an Ethernet card, an optical transceiver, a radio frequency transceiver, or any other type of device that can send and receive information. Network 128 can be any type of network for conveying information, such as Ethernet, mobile, cellular, etc. Authority figure can use a monitoring device 130 to communicate with controller 100 over network 128. Monitoring device 130 can be any type of communication device, such as mobile phone, tablet, personal computer, etc.

Figure 2:
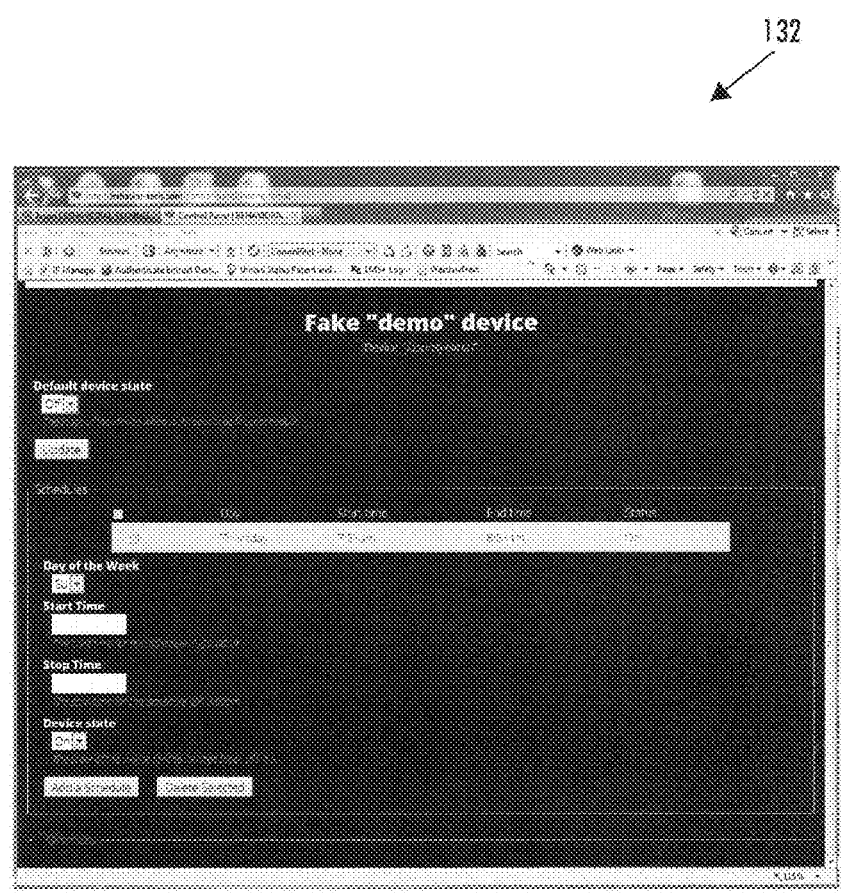
FIG. 2 is a depiction of a webpage on the control panel on the monitoring device of FIG. 1.
Figure 3:
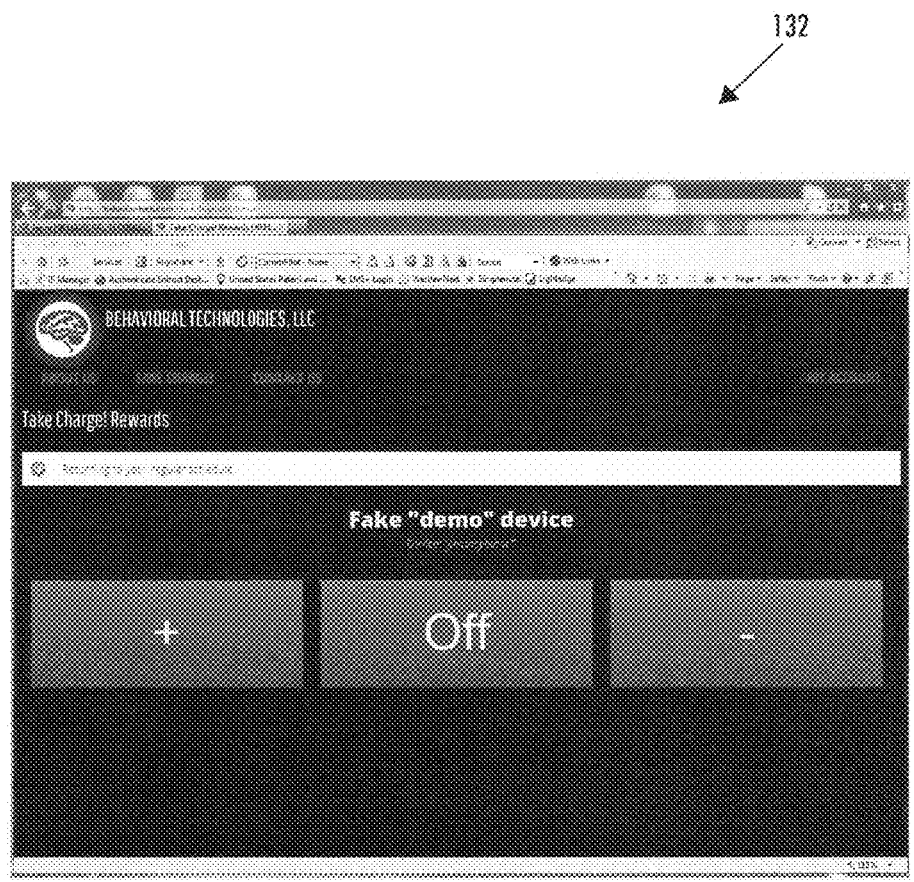
FIG. 3 is another webpage on the control panel on the monitoring device of FIG. 1.
Figure 4:
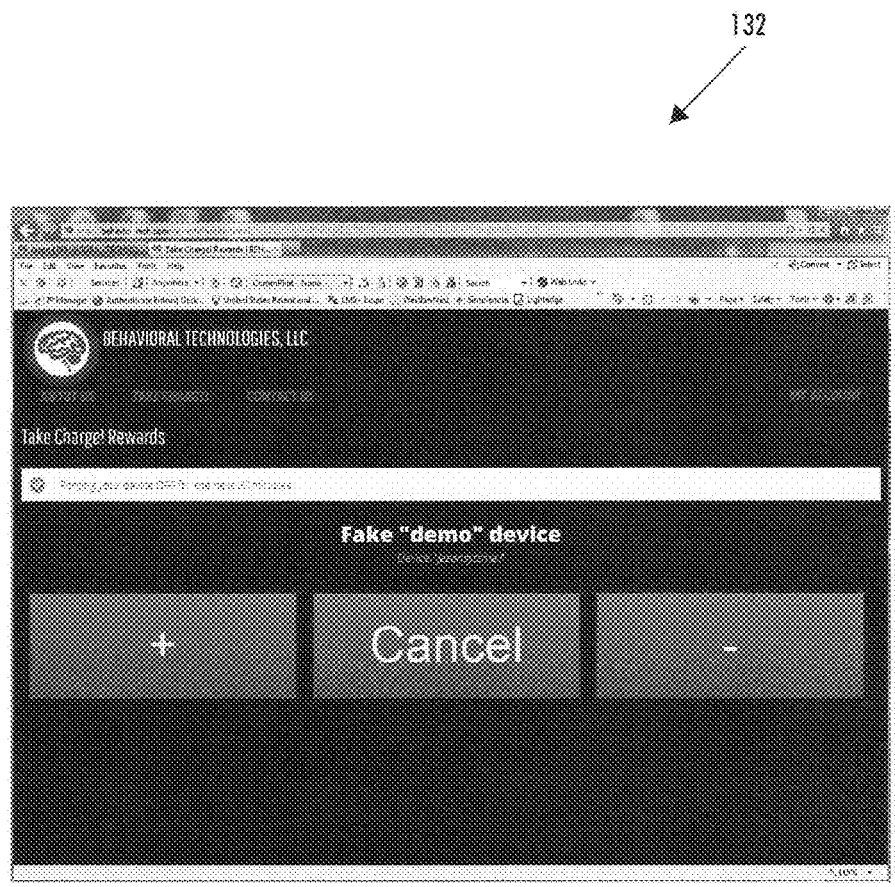
FIG. 4 is yet another webpage on the control panel on the monitoring device of FIG. 1.

The authority figure can use a control panel 132 on monitoring device 130 to interact with controller 100. FIGS. 2-4 show control panel 132. Control panel 132 can be software embedded on monitoring device 130 or can be a cloud-based system residing on an external server to allow the authority figure to interact with controller 100 from any location over the Internet, as shown in FIGS. 2-4. Control panel 132 has a scheduling field to display a visual summary of an individual family members information, such as, total viewing time, history, restrictions, settings, and the like. The authority figure could also receive alerts on monitoring device 130 whenever the child turns on display device 112. Furthermore, control panel 132 allows the authority figure to set restrictions, grant accesses, and transmit information to the children. Control panel 132 can also keep track and record the frequency of problematic behaviors. This can be accomplished through the use of a utility that has "real time" recording of events in document that parents or authority figures can access when they log into the website.

If a parental rating value exists for a viewing signal, control panel 132 may also censor for age appropriate content based upon the age the child. Embodiments of the age-appropriate content feature can provide the restrictions and settings based on the defined PRG ratings and/or based on optional configuration settings.

The foregoing screen time control system 10 has applications in clinical settings as well as private homes. For instance, the device can be used in "class-wide" interventions that will provide increased or decrease screen time or individual students in alternative educational settings for children with behavioral problems. Staff working with behaviorally disordered children or adults with Developmental Disabilities can use the device to encourage cooperative behaviors within group home settings. Counselors can work hand in hand with parents with not only the implementation of a Behavior Modification program, but also track their progress using the behavior tracking sheet. This is consistent with the Scientist Practitioner model of practice and allows for on-going Functional Behavioral Assessment of behavioral problems.

In this regard, screen time control device 10 is an innovative way for persons in authority (e.g., parents, teachers, etc.) to use wireless technology to monitor and gain control of screen time without the aforementioned power struggles. The authority figure simply uses their cell phone, tablet, or computer to log on to the website (i.e. control panel 132 on monitoring device 130) associated with controller 100 to monitor and alter screen time. The screen time control device 10 can also allow authority figures to add or subtract the amount of screen time that is allowed or available. This provides a way to encourage or "reward" cooperative behaviors and discourage problem behaviors and conflict. This system represents an easy, efficient, and effective way to monitor and control total screen time. The screen time control device 10 does not actually shut off the electronic appliance (e.g. television, computer, or gaming console). As a result, it does not harm any of the electronic appliances. It simply overlays a blank screen on the screen 111 of display device 112. The gaming system (or television, computer, etc.) (i.e. display device 112) continues to work, but the screen content cannot be viewed without adding more time. Individuals can also send on-screen notifications or other messages via the website and wireless device.

The systems and methods herein disclosed are not limited to regulating viewing of a display device among children in the home. The teachings of this disclosure are applicable in other environments, as well. TV viewing may be regulated in an institution, such as a prison, where behavior non-confrontational modification is desired.

While this disclosure has been particularly shown and described with reference to exemplary embodiments, it should be understood by those of ordinary skill in the art that various changes, substitutions and alterations can be made herein without departing from the scope of the invention as defined by the appended claims and their equivalents.

What is claimed is:

1. A system for regulating viewing of a screen on a display device, the system comprising:
   a source interface for receiving a video signal;
   a processor connected to the video source interface for overlaying the video signal with a translucent signal to produce an overlaid video signal; and
   a device interface connected to the processor for receiving the overlaid video signal and providing the overlaid video signal to the display device, wherein the processor modifies the translucent signal in the overlaid video signal with a parental signal, wherein the parental signal is a substantially opaque overlay signal that masks an image on the screen of the display device to prohibit viewing of the screen without turning off the display device in order to avoid damage to the display device.

2. The system of claim 1, and further comprising a screen time control region of memory and a first account profile that includes a daily allowed screen time value, wherein the daily allowed screen time value can be increased or decreased in real-time in response to a behavior of a person associated with the first account profile.

3. The system of claim 2, wherein when the daily allowed screen time value is zero the processor modifies the translucent signal in the overlaid video signal with the parental signal.

4. The system of claim 2, and further comprising a monitoring device connected to the processor through a network for monitoring the daily allowed screen time value of the first account profile and increasing or decreasing in real-time the daily allowed screen time value in response to the behavior of the person associated with the first account profile.

5. The system of claim 3, wherein the first account profile further comprise a scheduling time region of memory that specifies at least one time period for the first account profile where the parental signal masks the image on the display device.

6. A method for controlling a display device, the method comprising:
   receiving a video signal;
   overlaying the video signal with a translucent signal for producing an overlaid video signal;
   receiving the overlaid video signal and providing the overlaid video signal to a display device;

directing a processor to modify the translucent signal in the overlaid video signal with a parental signal that is one chosen from a substantially opaque overlay signal that masks an image on the display device to prohibit viewing of the display device, and a textual message; and providing a first account profile and a daily allowed screen value, and increasing or decreasing the viewing time at will and in real time in response to a behavior of a person associated with the first account profile.

7. The method of claim 6, and further comprising modifying the translucent signal in the overlaid video signal with the parental signal when the daily allowed screen time value is zero.

8. The method of claim 7, masking the image on the display device for prohibiting viewing of the display device without turning off the display device in order to avoid damaging the display device.

9. The method of claim 6, and further comprising monitoring the daily allowed screen time value of the first account profile and increasing or decreasing the daily allowed screen value in response to the behavior of the person associated with the first account profile.

10. The method of claim 7, and further comprising scheduling at least one time period for the first account profile for masking with the parental signal the image on the display device.

11. A system for controlling screen time of a display device, the system comprising:

a controller having a source interface, a processor, a device interface, and a parental interface;

the source interface is connected to a program source for receiving a video signal, the processor is connected to the source interface for receiving the video signal and overlaying the video signal with a translucent signal to produce an overlaid video signal, the device interface is connected to the processor for receiving and providing the overlaid video signal to the display device, and the parental interface is connected to the processor for receiving and providing to the processor instructions to modify the translucent signal in the overlaid video signal with a parental signal, wherein the parental signal is a substantially opaque overlay signal that masks an image on the screen of the display device to prohibit viewing of the screen.

12. The system of claim 11, and further comprising a memory connected to the processor in the controller for storing a first account profile associated with a viewer of the display device, wherein the first account profile includes a daily allowed screen time value, wherein the daily allowed screen time value can be increased or decreased in response to a behavior of the viewer.

13. The system of claim 12, wherein the parental signal masks the image on the screen of the display device to prohibit viewing of the screen without turning off the display device in order to avoid damage to the display device.

14. The system of claim 13, wherein the first account profile further comprise a scheduling time region of memory that specifies at least one time period for the first account profile where the parental signal masks the image on the display device.

15. The system of claim 14, and further comprising a monitoring device in communication with the controller through the parental interface, wherein the monitoring device has a control panel that allows to an authority figure to provide instructions to the processor to modify the translucent signal in the overlaid video signal with the parental signal.

16. The system of claim 15, wherein the control panel has a scheduling field that allows the authority figure to increase or decrease the daily allowed screen time value in response to the behavior of the viewer.

* * * * *